US007082466B1

(12) United States Patent
Steegmans et al.

(10) Patent No.: US 7,082,466 B1
(45) Date of Patent: Jul. 25, 2006

(54) METHOD FOR ACCESSING A SERVICE PLATFORM VIA AN INTERNET BROWSER SESSION

(75) Inventors: Frank Steegmans, San Jose, CA (US); Steven Vermeulen, Grobbendonk (BE)

(73) Assignee: Alcatel, Paris (FR)

( * ) Notice: Subject to any disclaimer, the term of this patent is extended or adjusted under 35 U.S.C. 154(b) by 812 days.

(21) Appl. No.: 09/680,283

(22) Filed: Oct. 6, 2000

(30) Foreign Application Priority Data

Oct. 8, 1999 (EP) .................................. 99402483

(51) Int. Cl.
*G06F 15/173* (2006.01)
(52) U.S. Cl. ...................... 709/225; 709/203; 709/227; 709/229
(58) Field of Classification Search ........ 709/202–203, 709/223–225, 217–219, 227–229, 103
See application file for complete search history.

(56) References Cited

U.S. PATENT DOCUMENTS

| 6,330,586 | B1 * | 12/2001 | Yates et al. ................. 709/227 |
| 6,332,081 | B1 * | 12/2001 | Do ............................. 455/461 |
| 6,510,466 | B1 * | 1/2003 | Cox et al. ................... 709/229 |

OTHER PUBLICATIONS

Van Halteran et al, "Value Added Web : Integrating WWW with a TINA Service Management Platform", Telecommunications Information Networking Architecture Conference Proceedings, Apr. 12-15, 1999.*
Hong et al, "A Networking Architecture for Mobility Services Using Mobile Agent Approach", Global Convergence of Telecommunications and Distributed Object Computing Proceedings, Nov. 17-20, 1997.*
De Zen et al, "Value-Added Internet : a Pragmatic TINA-Based Path to the Internet and PSTN Integration", Global Convergence of Telecommunications and Distributed Object Computing Proceedings, Nov. 17-20, 1997.*
Manione et al, "A "TINA light" Service Architecture for the Internet-Telecom Scenario", Telecommunications Information Networking Architecture Conference Proceedings, Apr. 12-15, 1999.*
Jormakka et al, "Agent-based TINA Access Session Supporting Retailer Selection in Personal Mobility Context", Telecommunications Information Networking Architecture Conference Proceedings, Apr. 12-15, 1999.*

(Continued)

*Primary Examiner*—Philip B. Tran
(74) *Attorney, Agent, or Firm*—Sughrue Mion, PLLC

(57) ABSTRACT

The invention is directed to a method for accessing a service platform via an Internet browser session, as well as to a servlet, a service unit and an applet for performing the method. The method is made up of a number of steps. The first step is installing the servlet at a web-server of a content provider having access to this service platform. When a user then tries to use a service of this service platform, the servlet detects whether or not said browser session is already associated to a related service session. If the browser session is already associated to this related service session, it performs predetermined actions related to the service session, such as charging. If the browser session is not associated to the related service session, it returns a web page containing the applet to guide an associated browser of the user through a logon process for the related service session. In the end the user may access the service session via the browser session.

19 Claims, 1 Drawing Sheet

OTHER PUBLICATIONS

Smith, "Applying TINA-C Service Architecture to the Internet and Intranets", Global Convergence of Telecommunications and Distributed Object Computing Proceedings, Nov. 17-20, 1997.*

G. De Zen, et al.: "Value-added Internet: a pragmatic TINA-Based Path to the Internet and PSTN Integration" Proceedings TINA. Global Convergence of Telecommunications and Distributed Object Computing, Nov. 17, 1997, XP002082941.

Y. Koga, et al.: "Service Architecture for Utilizing TINA-based public network services from the Internet environment" Proceedings 23rd Annual Conference on Local Computer Networks. LCN '98 (Cat. No. 98TB100260), Lowell, MA, USA, IEEE Comput. Soc., USA ISBN: 0-8186-8810-6.

R. Manione, et al.: "A "TINA light" service architecture for the Internet -telecom scenario" TINA '99, 1999 Telecommunications Information Networking Architecture Conference Proceedings (Cat. No. 99EX368), Oahu, HI, USA, Apr. 12-15, 1999, pp. 24-32, XO002133862 1999, Piscataway, NY, USA, IEEE, ISBN: 0-7803-5785-X.

T. Mota et al.: "TINA as a virtual market place for Telecommunication and information services: the VITAL experiment" TINA '99, Telecommunications Information Networking Architecture Conference Proceedings (Cat. No. 99EX368), Oahu, HI,USA, Apr. 12-15, 1999, 'Online! pp. 96-106, XP002133863, Piscataway, NJ, USA, IEEE, ISABN: 0-7803-5785-X, retrieved from the internet <URL:http://ww.tinac.com/papers> 'retrieved on Mar. 23, 2000.

"How to Integrate the TINA and The Internet", by Klaus-Peter Eckert, et al., COMDEX Enterprise, Frankfurt Germany, Sep. 1998.

De Zen, G. et al.: "Value-added Internet: a pragmatic TINA-based path to the Internet and PSTN Integration" Proceedings TINA. Global Convergence of Telecommunications and Distributed Object Commuting, Nov. 17, 1997, XP002082941.

Koga, Y, et al.: "Service Architecture for utilizing TINA-based public network services from the Internet environment" Proceedings 23rd Annual Conference on Local Computer Networks. LCN'98, (Cat. No. 98TB100260), Lowell, MA, USA, Oct. 11-14, 1998, pp. 162-171, XP002133861, Los Alamitos, CA, USA, IEEE Comput. Soc., USA ISBN: 0-8186-8810-6.

Manione, R. et al.: "A "TINA light" service architecture for the Internet-Telecom scenario" TINA '99, 1999 Telecommunications Information Networking Architecture Conference Proceddings (Cat. No. 99EX368), Oahu, HI, USA, Apr. 12-15, 1999, pp. 24-32, XP00133862, 1999, Piscataway, NJ, USA, IEEE, USA ISBN: 0-7803-5785-X.

Mota, T. et al.: "TINA as a virtual market place for telecommunication service and information services: the vital experiment" TINA '99, 1999 telecommunications Information Networking Architecture conference Proceedings (Cat. No. 99EX368), Oahu, HI, USA, Apr. 12-15, 1999, 'Online!', pp. 96-106, XP2133863 1999, Piscataway, NJ,USA, IEEE, USA ISBN: 0/7803-5785-X, retrieved from the Internet <URL:http://www.tinac.com/papers> retrieved on Mar. 23, 2000!.

* cited by examiner

METHOD FOR ACCESSING A SERVICE PLATFORM VIA AN INTERNET BROWSER SESSION

BACKGROUND OF THE INVENTION

The present invention relates to a method for accessing a service platform via an Internet browser session, to a servlet for being installed at a web-server of a content provider, a service unit of a content provider having access to a service platform and to an applet for accessing a service platform via an Internet browser session.

Such a method is already known in the art, e.g. from the paper "HOW TO INTEGRATE THE TINA AND THE INTERNET" from the authors Klaus-Peter Eckert et al, first published by COMDEX Enterprise, Frankfurt Germany in September 1998. Therein, is described that the being the de facto standard for the worldwide exchange of all kinds of information has some drawbacks. One of the main drawbacks is that there is no consistent way to identify a user, provide the ability to subscribe, tailor, manage, and/or account his preferred services.

On the other hand there is a service platform, called the TINA service platform in the paper, that fills in this gap in the area of telecommunications and information technology wherein, in contrast to the Internet the service platform provides the means to identify bilaterally the service provider and the service-customers and users.

This paper further extends the service platform for the deployment and usage of telecommunications and information technology services in a way, that the typical Internet user can try out services, called TINA-services and subscribe and tailor them on-line and with respect to security policies and personal preferences.

But still there is no integration of the service platform with the internet, which has the disadvantage that an internet session can not rely on an established infrastructure for service management, (i.e. accounting, billing, deployment, etc.) nor on an advanced business model and that the service session provided by the service platform such as the TINA-service platform can not be used to accommodate simple services as the internet with all the outstanding features that it provides.

A further approach is known from the article "Value-Added Internet: a Pragmatic Tina-Based Path to the Internet and PSTN Integration", De Zeng et al., Proceedings TINA, Global Convergence of Telecommunications and Distributed Object Computing, 17.11.1997, page 13 to 21.

According to this approach, TINA components accessed via the Internet: The End User is a classical Internet user (in a private or business environment). To enable the End User to enjoy the added value provided by the TINA service platform, additional software incorporating a CORBA client has to be installed in order to make his browser TINA capable. The user is now able to communicate by this additional software with TINA components and initiate a TINA service session. The TINA service platform takes also the role of a connectivity provider. It selects the most appropriate transport technology and establishes the dedicated connection required in order achieving the desired quality of service.

According to this approach, a service is requested by sending a service request via the Internet to the dedicated component of the TINA service architecture. An appropriate service provider is selected by the TINA service platform. The connection between the user and said selected service provider is established on the basis of a request coming from a retailer component of the TINA service platform.

SUMMARY OF THE INVENTION

An object of the present invention is to provide a method of the above known type but wherein the integration of service platforms such as the TINA service platform and the Internet are improved.

According to the invention, this object is achieved due to the fact that a web-browsing session is associated with a service platform service session by having JAVA components exchange information.

To perform this, a special servlet is installed at the web-server of the content provider. Depending on the configuration of this particular server, this servlet will be triggered by a certain or all Uniform Resource Locators further referred to as URL. The provider will start a service session and associate it with certain URLs via a database or equivalent thereof. The provider part of the service session and the servlet will communicate to implement the necessary charging and protection mechanisms.

The servlet will detect whether the browser session that requests the URL is already associated to a certain user in a particular service session. If so, it will perform particular actions related to the URL, which may be stored in a database, i.e. charge the party a particular amount and eventually communicate this back to the service session.

If not, it will return a web page containing an applet that will walk the browsing user through the logon process for the particular service session associated with the URL. This may include logon to a retailer and starting of an access session. If these exist, the applet may reuse them. Finally the consumer's 'user-application', will be launched. This one will contact the service session and inform the 'provider' via the service session about association of a certain browser session with a particular party and eventually pass accounting procedures for this party. Then the initial URL will be re-requested by the applet. Now the servlet will find the association of the web browser session and the service session.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
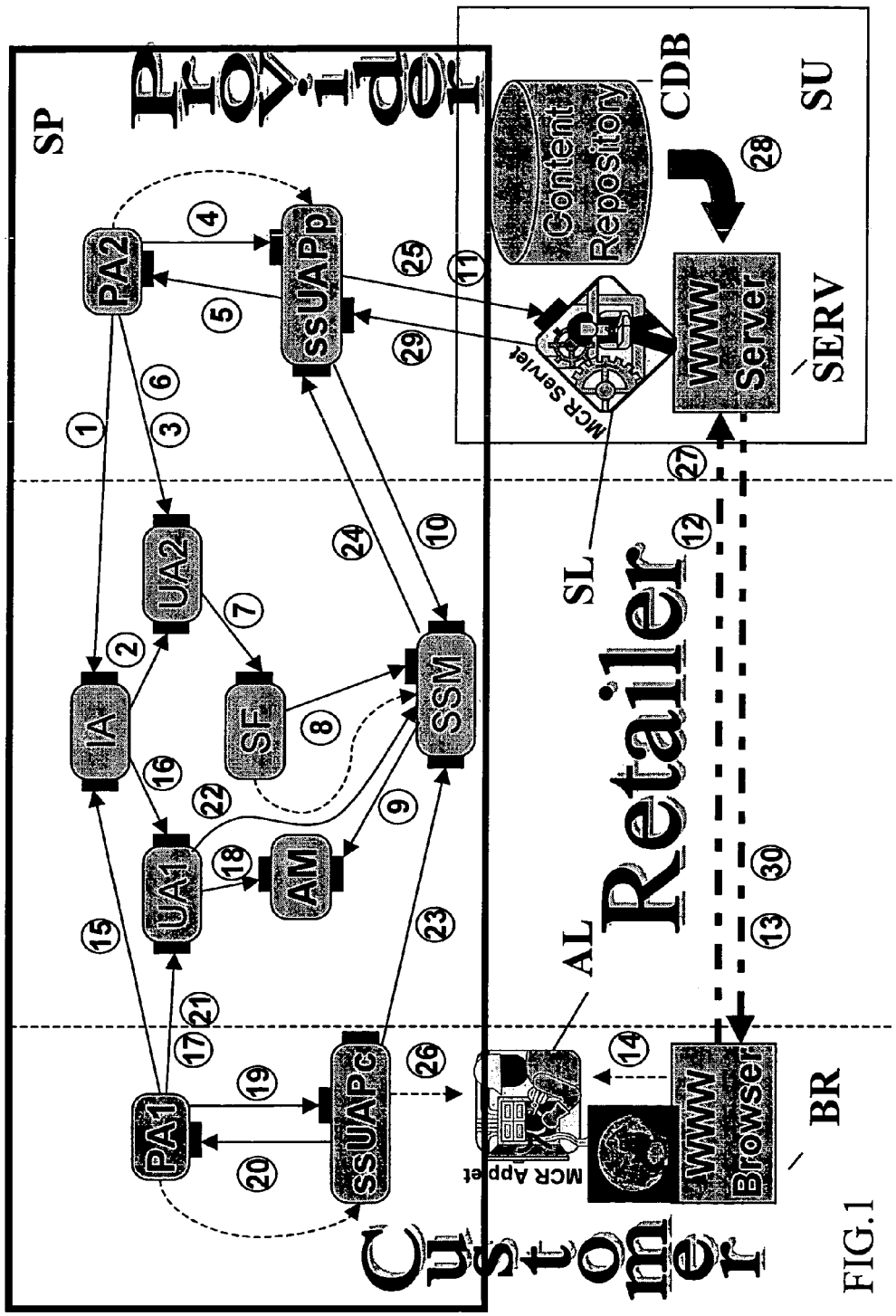
FIG. 1 represents a detailed scenario of the integration of a TINA like service session and the Internet web browsing session.

In the following paragraphs, referring to the drawing presented in FIG. 1, the implementation of the method according to the present invention will be described. The first part of this description is made on a high level and a second part of the description is made on a more detailed level using instructions. Subsequently there is a second embodiment described in a same way as the first one, but differing in that only differences compared to the first one are described.

FIG. 1 shows several service components PA1, PA2, ssUAPc, ssUAPp, UA1, UA2, AM, SSM, SF and IA, a servlet SL, an applet AL, a browser BR, and server SERV and a content repository CDB. The service components PA1, PA2, ssUAPc, ssUAPp, UA1, UA2, AM, SSM, SF and IA are components of a service platform SP. The above reference components are assigned to three domains Customer, Retailer and Provider. The service components PA1 and ssUAPc, the applet AL and the browser BR are assigned to the domain Customer. The service components UA1, UA2, AM, SF, SSM and IA are assigned to the domain Retailer and perform the function fo a retailer. The service components PA2 and ssUAPp, the servlet SL, the server SERV and the content repository CDB are assigned to the domain Provider.

The service platform SP contains application software components, which are deployed on a distributed processing platform. This distributed processing platform is formed, for instance, by several connected computers and middelware components, which enables the communication of said software components independent from the actual location of said application software components. The middelware components provides a software layer on top of the native computing and communication environment, which hides details of the underlying (probably heterogeneous) technology and distributions concerns from the application software components.

The service components PA1, PA2, ssUAPc, ssUAPp, UA1, UA2, AM, SSM, SF and IA are these application software components that perform the core functionality of the service platform SP, which is to manage the provision of services. These components are deployed in domains pertaining to consumers, retailers and providers as shown, for instance, by FIG. 1. They interact by means of communication services performed by the underlying middelware-components. Each of the service components PA1, PA2, ssUAPc, ssUAPp, UA1, UA2, AM, SSM, SF and IA contains a well-defined interface for these interactions with other service components. The interaction possibilities and interfaces are indicated, for instance, by FIG. 1.

The domains Customer, Retailer, and Provider represents the stakeholders (e.g. private person, company) which runs the respective assigned software components. The domain Customer contains the software components of a specific user, who consumes services. The domain Provider contains the software components of a specific user, who provides services. Both, the domains Customer and Provider are therefore classified as user domains. The domain Retailer contains the software components of a retailer, who sells different kinds of services and mediates between the users of the domains Consumer and Provider. The domain Retailer is therefore classified as provider domain. It provides as service the provisioning of services or the offering of services to users.

The interfaces between the service components PA1, PA2, ssUAPc, UA1, UA2, AM, SSM, SF and IA represents these contractual relations between the users and the provider. It is possible that the service platform SP covers a high number of such domains, and thereby represents a high number of users or providers.

A good example for such a service platform is the TINA platform (TINA=Telecommunications Information Network Architecture). It is also possible to use for a service platform according to the invention a CORBA or DCOM style architecture (CORBA=Common Object Request Broker Architecture, DCOM=Distributed Component Object Model) as service platform. It is for instance possible to use service components according to FIG. 1 on top of a CORBA software bus. The service components PA1, PA2, ssUAPc, UA1, UA2, AM, SSM, SF and IA may be formed by objects which perform the respective functions as described by FIG. 1.

The service components PA1, PA2, UA1, UA2 and IA are access session related service components. They offer a personalized and secure access to services. The service components PA1 and UA1 relate to the access session between the user of the domain Customer and the provider of the domain Retailer. The service components PA2 and UA2 relate to the access session between the user of the domain Provider and the provider of the domain Retailer. The service components PA1 and PA2 as well as the service components UA1 and UA2 perform within theses access session the same function. Therefore, the interaction between the service components PA1 and UA1 as described in the following forms also an instance for the interaction between the service components UA2 and PA2.

The service components PA1 and UA1 interact within a secure, trusted relationship between the user and the provider (access session). They support authorization, authentication and customization of the user's service access and provide a secure mechanism for starting and joining sessions. They may also support control for service interactions.

The service component PA1 and PA2 performs the function of a provider agent. They respectively represent a provider in a user domain and respectively exist corresponding to each provider. Such kind of components therefore represents the provider of the domain Retailer in the domains Customer and Provider.

The service component UA1 and UA2 performs the function of a user agent. A user agent represents a user in the provider domain, for instance in the domain Retailer, and exists corresponding to each user. Within the domain Retailer exist therefore one service component UA1, which represent the user of the domain Customer, and one service component UA2, which represent the user of the domain Provider. The service components UA and UA2 are independent of services utilized by users, and respectively manages a user profile and session profiles. It is also possible that a user agent has additional the role of a user session manager as defined in the TINA Architecture. In the access session, the user agent provides functions for authenticating a user and checking her/his profile, which, for instance includes user's subscription information. In the service session, it provide functions for creating session profile and making requests to corresponding service session managers, e.g. to the service component SSM.

The service component IA performs the function of an initial agent. The service component IA is the initial contact point for the service components PA1 and PA2 wishing to interact with the provider, and is used to gain an access session with the service component UA1 and UA2, respectively.

The service components ssUAPc, ssUAPp, AM and SSM are service session related service components. They provide a framework for defining services, which can be accessed and managed across multiple domains.

The service component SF performs the function of a service factory. Based on requests from the service components UA it instantiates service session managers, which provide service session control capabilities. The service component SF instantiates, for instance, the service component SSM on request from the service component UA. It is also possible that the service component SF instantiates in addition a user session manager which supports the session control capabilities dedicated to a user.

The service component SSM performs the function of a service session manager, which manages and controls a specific service. It exists corresponding to each service. It performs important operations in a service session, holding service specific data and managing the life cycle of the service session.

The service component ssUAPc and ssUAPp performs the function of a user application. The service component ssUAPc and ssUAPp in the user domain allows a user to interact with a service session and acts as an endpoint for session control.

The service component AM performs the function of an announcement manager. This service component contains a list of available services, i.e. announced services.

The browser BR is a WWW browser (WWW=World Wide Web) which enables its user to communicate via the WWW. The browser BR forms also a platform to run applets. It performs a platform on which HTML pages (HTML=Hypertext Markup Language) and JAVA programs are interpreted and executed. It contains for instances a Java virtual machine to run Java applets.

The server SERV is a WWW server, which performs services within the WWW and enables these services to communicate with users via the WWW. The server SERV forms also a platform to run servlets. To perform that function, the server contains, for instance, a Java Virtual Machine, to run JAVA servlets on the WWW server. The server SERV has further support the Servlet API (=Application Program Interface). Essentially, the servlet API is a well-defined set of function calls to get and send information to and from the WWW server. The servlet needs to be able to access server-defined variables, issue redirects, send error messages and the like.

Further, the server SERV is linked with the content repository CDB. By means of the content repository it makes the contents managed by the content repository CDB available to users of the WWW.

The servlet SL is a MCR servlet (MCR=Managed Content Retrieval), which is a servlet that perform as function the support, management and control of the service "Managed Content Retrieval". A servlet is the opposite end of an applet. A servlet can almost be thought of as a server-side applet. It contains a (de-facto standardized) servlet API that fits with the servlet API of the WWW server. The servlet API is, for instances, a set of Java classes, which can be downloaded directly from a JAVA supplier (e.g. SUN) independently from the WWW server. Servlets run inside a WWW server in the way that applets run inside a WWW browser. The WWW browser can submit a request to execute a servlet directly; it can be stand-alone in terms of its actions—as a browser can request an applet directly.

The servlet SL keeps a list of registered WWW browsers sessions and the related interface of the service component ssUPAp, referred to as ssUAPMCRInterface, the related identification of the party, referred to as PartyId, and the related accounting policies.

The applet AL is a MCR applet (MCR=Managed Content Retrieval), which is an applet that performs as function the support, management and control of the service "Managed Content Retrieval".

The detailed role and function of the MCR servlet and the MCR applet will become clear in the following description of a method according the present invention.

Following steps of the method according to the present invention may be distinguished:

In a first step, the servlet SL is launched together with the server SERV.

In a second step, the 'Content Provider', which is the user of the domain Provider, goes through the login procedure and starts a 'Managed Content Retrieval' service session at his retailer. As a result the service component ssUAPp is launched. This applet has a Graphical User interface for managing the service session. It will register itself and the announced service session with the servlet SL. It also registers its and eventually the SSM service specific interface with the servlet SL.

The service 'Managed Content Retrieval', later referred to as MCR service, is now registered and ready to be provided to users of the domain Customer, who likes to consume this service.

In a third step, the user browses content on the WWW. Each time a link is requested on the MCR service provider's WWW server, i.e. a link is requested on the server SERV, the servlet SL is invoked. It then performs following function:

When a registered www browser session fetches information, the servlet SL will retrieve the information related to the requested URL, do the required accounting, contact the service component ssUAPp if necessary and return the information if granted. A browser session is registered by the servlet, if a service session is associated to this browser session. If the browser session is not registered, it will return a web page containing the applet AL. The applet AL will try to find whether the user is already in an access session, if not it will establish one. After that the applet will join the referenced MCR service session in the context of the access session.

After the applet has registered the browser session via joined service session at the user side, that possibly may be launched in one go as indicated in the scenario above, it will again request the initial URL.

The servlet will now find that the web-session is registered and react as indicated in above.

From then on, each hit to the server will be processed in a similar way.

The subsequent detailed scenario describes the detailed steps of the method as presented in FIG. 1. The used numbers correspond to numbered steps in FIG. 1.

The first steps refer to the procedure, which is necessary that the 'Content Provider' login and starts a 'Managed Content Retrieval' service session at his retailer. This process may be separated first in an access session and second in a MCR service creation and registration procedure.

Access Session:

1. A message "requestNamedAccess( )" is sent from the service component PA2 to the service component IA.
2. A message with the content "setupAccessSession( )" is sent from the service component IA to the service component UA2.
2r., 1r. A message with the content "Secretid, UAinterfaceRefs, AccessSessionId" is returned from the service component UA2 via the service component IA to the service component PA2.
3. A message with the content "UA2setUserContext (PAInterfaceRefs), listSubscribedServices( )" is sent from the service component PA2 to the service component UA2.
3r. A message with the content "SubscribedServicesList" is returned from the service component UA2 to the service component PA2.
4. The service component ssUAPp is instantiated by the service component PA2. A message with the content "startServiceInit(PAInterfaceRefs)" is sent from the service component PA2 to the service component ssUAPp.

MCR service creation and registration procedure:

5., 6. A message with the content "startService( )" is sent from the service component ssUAPp via the service component PA2 to the service component UA2.

7. A message with the content "createSSession( )" is sent from the service component UA2 to the service component SF.

8. The service component SF instantiates the service component SSM, which is the service session manager for the MCR service. A message with the content "initialise( )" is sent from the service component SF to the service component SSM.

9. A message with the content "registerAnnouncement( )" is sent from the service component SSM to the service component AM.

9r. A message with the content "announcementId" is returned from the service component AM to the service component SSM.

8r., 7r., 6r., 5r. A message with the content "RetUsage-InterfaceRefs of SSM+partyId" is returned from the service component SSM via the service components SF, UA2, PA2 to the service component ssUAPp.

10. A message with the content "setPartyContext(partyId, ssUAPpInterfaceRefs); listAnnouncement( ) /* Service specific */" is sent from the service component ssUAPp to the service component SSM.

10r. A message with the content "announcementId" is returned from the service component SSM to the service component ssUAPp.

11. A message with the content "RegisterUAP(ssUAPInterfaceRefs, announcementId, MCRAppletURL)" is sent from the service component ssUAPp to the serviet SL.

The MCR service is now installed and ready to be invoked by users. Following procedure is executed if the user of the domain Customer accesses via the browser BR the server SERV and request the MCR service:

12. A message with the content "HTTP fefch <URL>" is sent over an Internet connection by means of the HTTP protocol (HTTP=Hypertext Transfer Protocol) from the browser BR to the Server SERV to initiated a WWW browser session.

13. The servlet SL is invoked. It detects that the invoking WWW browser session is unregistered. Thus it initiates the transmission of an HTML page by means of the HTTP protocol from the server SERV to the browser BR. The HTML page contains as content the applet AL, a cookie and the information "sessionId" and "announcementId". The information "sessionId" identifies the Www browser session and the information "announcementId" identifies the MCR service within the service platform SP.

14. The applet AL tries to bind to the already existing service component PA1. If the service component PA1 does not exist, it launches the service components PA1.

Following procedure is then initiated by the applet AL to launch the service component ssUAPc, to start an access session and join the MCR service session:

15. A message with the content "requestNamedAccess( )" is sent from the service component PA1 to the service component IA.

16. A message with the content "setupAccessSession( )" is sent from the service component IA to the service component UA1.

16r., 15r. A message with the content "SecretId, UAinterfaceRefs, AccessSessionId, partyId" is returned from the service component UA1 via the service component IA to the service component PA1.

17. A message with the content "setUserContext(partyId, PAInterfaceRefs), listSubscribedServices( ), listSessionAnnouncements(announcementId)" is sent from the service component PA1 to the service component UA1.

18. A message with the content "listSessionAnnouncements(announcementId)" is sent from the service component UA1 to the service component AM.

18r. A message with the content "AnnouncementList" is returned from the service component AM to the service component UA1.

17r. A message with the content "SubscribedServicesList+AnnouncementList" is returned from the service component UA1 to the service component PA1.

19. The service component PA1 instantiates the service component ssUAPc. A message with the content "joinSessionInit(announcementId)" is sent from the service component PA1 to the service component ssUAPc.

20., 21, 22 A message with the content "joinSessionWithAnnouncement(announcementId)" is sent from the service component ssUAPc via the service components PA1 and UA1 to the service component SSM.

22r., 21r., 20r. A message with the content "RetUsage-InterfaceRefs of SSM+partyId" is returned from the service component SSM via the service components PA1 and UA1 to the service component ssUAPc.

23. A message with the content "setPartyContext(partyId, ssUAPcInterfaceRefs, ssProperties={webSessionId, accountingProfile})" is sent from the service component ssUAPc to the service component SSM. By that, the service component ssUAPc tries to join a MCR service session.

24. A message with the content "joinSessionInfo(partyId, ssProperties) /* only invoked on owner's ssUAP */" is sent from the service component SSM to the service component ssUAPp. That confirms the joining of a MCR service session.

25. A message with the content "registerParty(partyId, webSessionId, accountingProfile, ssUAPInterfaceRef)" is sent from the service component ssUAPp to the serviet SL.

26. A message with the content "joinServiceSessionSuccess . . . /* signal applet */" is sent from the service component ssUAPc to the applet AL.

Now, the MCR services session is joint and the applet AL initiates to send to the server SERV a new request to perform the MCR service. The server SERV does now accept the service request and provides the MCR service:

27. A message with the content "HTTP fetch <URL>" is sent as repeat fetch over an Internet connection by means of the HTTP protocol from the browser BR to the server SERV. The web browser session is now recognized by the servlet SL as registered and it initiates the delivering of the content to the server SERV by the content repository CDB.

28. A message with the content "retrieveURLInfo: ChargingInfo+Content" is sent from the content repository CDB to the server SERV.

29. A message with the content "chargePartyReq(partyId, charge, contentType, . . . )" is sent from the servlet SL to the service component ssUAPp.

29r. A message with the content "Ok" is returned from the service component ssUAPp to the serviet SL. The servlet SL initiates now the delivering of the requested content, i.e. the provisioning of the requests service, to the requesting browser BR.

30. The requested URL content is returned by means of the HTTP protocol from the server SERV to the browser BR. The delivered content is displayed in the browser BR.

Subsequently the second embodiment is described. Using a similar technique as described above, a service sessions announcement 'service' can be integrated with the WWW.

The retailer uses a web server that is equipped with an announcement Servlet to announce running service sessions to browsing users on the www.

Be aware of the fact that access policies can be applied by integrating a service as described before, i.e. for only announcing sessions to a limited group of users.

The announcement manager will publish running service sessions through the use of Hyper Text Markup Language-pages. This may also be performed by other techniques, i.e. active server pages, Extended Markup Language, etc. It will also keep this information consistent with the effective sessions.

The pages that are retrieved by the user contain information related to the service session as well as links to the servlet SL. These links give the user a point-and-click way of accessing the service session. This could be simply joining the session, but also changing configurations, etc. The following scenario explains in more detail how this mechanism works for having a user join an arbitrary service session. It starts from step 9 in the previous described detailed scenario.

10. The AM updates its content database with the new service session information and handles (links).
11. The user browses the web pages with this service session information.
12. The user selects a link to join the service session. This invokes a request on the servlet SL with the selected parameters. It is within this context possible that the servlet SL is launched on a web server different from the web server SERV, i.e. the applet is delivered from a web server different from the web server which delivers the content.
13. The servlet SL returns the join applet AL.
14. The join applet AL walks the user through the same process as in the previous example that is described in steps step 14 to 22.

It is to be remarked that the core of this method can be extended in numerous ways, i.e. use announcement service sessions, hence web server providers can be paid for their advertisement, etc.

While the principles of the invention have been described above in connection with specific apparatus, it is to be clearly understood that this description is made only by way of example and not as a limitation on the scope of the invention, as defined in the appended claims.

The invention claimed is:

1. A method for accessing a service platform (SP) via an Internet browser session, said method comprising steps of:
    (a) installing a servlet at a web-server of a content provider having access to said service platform;
    (b) when a user tries to use a service of said service platform by contacting said web server of said content provider within a certain browser session, detecting by said servlet whether or not said certain browser session is already associated to a related service session;
    (c) if said certain browser session is already associated to said related service session, performing predetermined actions related to said service session;
    (d) if said certain browser session is not associated to said related service session, the servlet returning a web-page containing an applet to guide an associated browser of the user through a logon process for said related service session and after the logon process via the applet, the applet initiates a re-request to access the service session by initiating a re-contacting of said web server of the content provider; and
    (e) said user accessing said service session via said certain browser session.

2. A method as in claim 1, wherein said user accessing said service session via said certain browser session by using said applet received within said browser session for accessing said service session.

3. A method as in claim 1, wherein said received applet is launched on said browser.

4. A method as in claim 1, wherein said applet contacts said service session and informs said servlet via the service session about the association of said certain browser session to said service session.

5. A method as in claim 4, wherein said servlet is informed via the service session about the association of said certain browser session with a particular party.

6. A method as in claim 5, wherein accounting procedures for said party are passed to said servlet.

7. A method as in claim 4, wherein for contacting the service session, said applet starts an access session and logs on to a retailer.

8. A method as in claim 7, wherein said applet tries to find, whether the user is already in an access session and if not it will establish one.

9. A method as in claim 7, wherein during the log on, a user-application service component is launched.

10. The method as in claim 1, wherein one of said predetermined actions is charging.

11. The method in claim 1, wherein, when said certain browser session is not associated to said related service session, the servlet of the content provider sends a web-page containing the applet to the browser of the user, wherein the sent applet guides the browser of the user through the logon process to a retailer, and wherein, after the logon process, informing the content provider of an established association between the browser of the user and the retailer.

12. The method according to claim 1, wherein the servlet is launched at the web-server of the content provider and wherein the servlet returns the applet to the browser of the user, said applet, executed on the user browser, serves as a proxy for interaction between the user browser and a retailer.

13. The method according to claim 1, wherein the servlet provides the applet to the browser of the user and the browser of the user executes the applet guiding central authentication to a retailer, wherein, after the central authentication, the retailer informs the service provider of an association between the browser of the user and a party providing the service, and wherein, after the retailer informs the service provider of the association, the applet re-requests access to the service and the servlet associates the browser of the user to the related service.

14. A servlet for being installed at a web server, said servlet is adapted for performing following steps when executed on said web server:
    when a user tries to use a service of said service platform by contacting said web server within an certain browser session, detecting whether or not said certain browser session is already associated to a related service session of a service platform;

if said certain browser session is already associated to said related service session, performing predetermined actions related to said service session; and if said certain browser session is not associated to said related service session, the servlet returning a web-page containing an applet which is adapted for guiding an associated browser of the user through a logon process for said related service session at the service platform and after the logon process via the applet the applet initiates a re-request to access the service session by initiating a re-contacting of said web server of the content provider.

15. A servlet as in claim 14, wherein said servlet keeping a list of www browser sessions associated to service sessions of said service platform and related interfaces of user-application service components of said service platform.

16. A servlet as in claim 14, wherein said servlet, when launched on said web server, goes through a login procedure and starts a service session at a retailer of said service platform.

17. A servlet as in claim 16, wherein said servlet, when launched on said web server, launches a respective user-application service component within the service platform.

18. A service unit of a content provider having access to a service platform, said service unit comprising a content repository for providing content, a web-server for enabling the service unit to be a party of a Internet browser session and a servlet as in claim 14, being installed at said web-server.

19. A service unit as in claim 18, wherein each time a link is requested on the web server, the servlet is invoked.

* * * * *